United States Patent [19]

Lloyd

[11] Patent Number: 5,949,593
[45] Date of Patent: Sep. 7, 1999

[54] OFF-LOADED STRUT JOINT MIRROR SUPPORT SYSTEM

[75] Inventor: Carl A. Lloyd, Bloomfield, N.Y.

[73] Assignee: Eastman Kodak Company, Rochester, N.Y.

[21] Appl. No.: 09/039,841

[22] Filed: Mar. 16, 1998

[51] Int. Cl.$^6$ .............................. G02B 5/08; F16C 32/06
[52] U.S. Cl. ......................... 359/849; 384/109; 359/846
[58] Field of Search ................................... 359/846, 848, 359/849, 875, 878; 384/12, 109

[56] References Cited

U.S. PATENT DOCUMENTS

| | | | |
|---|---|---|---|
| 3,137,531 | 6/1964 | Hermann et al. | 384/109 |
| 3,154,627 | 10/1964 | Wallis | 359/848 |
| 3,463,563 | 8/1969 | Pfaff | 384/12 |
| 3,599,377 | 8/1971 | Dartnell | 451/43 |
| 4,113,325 | 9/1978 | Miller | 384/109 |
| 4,295,710 | 10/1981 | Heinz | 359/849 |
| 4,410,220 | 10/1983 | Robinson | 384/109 |
| 4,500,170 | 2/1985 | Montesanto | 359/849 |
| 5,035,497 | 7/1991 | Itoh | 359/849 |
| 5,535,043 | 7/1996 | LaFiandra et al. | 359/224 |

Primary Examiner—Cassandra Spyrou
Assistant Examiner—Mark A. Robinson
Attorney, Agent, or Firm—Mark G. Bocchetti

[57] ABSTRACT

Strut joint assemblies which include built-in off-loading capability or mirror support systems allow a user to minimize the friction developed at the ball joint interface. Each strut joint assembly includes an upper ball joint and a lower ball joint. Each of the ball joints is sealed such that an internal compartment is created which can act essentially as an air spring. By raising the air pressure within these compartments, the load on the ball joint is reduced until the joint separates and air pressure alone carries the entire load. By adjusting the pressure to a value just below the separation pressure, the ball can still maintain contact with the ball socket and carry very little of the actual load. At this pressure, the frictional moment that can be generated by the joint is minimized and is, thus, greatly reduced from the frictional moment developed by a joint which is carrying the full gravity load of the mirror. The entire strut assembly may be translated using an adjusting screw at the lower end of the strut. Once adjustment of the mirror position is complete, the joint may be locked by injecting an epoxy adhesive into the cavity between the strut shank shoulder and the potting cup of the mount pad and allowed to cure. After the epoxy is cured, air pressure may be released.

18 Claims, 4 Drawing Sheets

OFF-LOADED STRUT JOINT MIRROR SUPPORT SYSTEM

FIELD OF THE INVENTION

The present invention relates generally to mirror support devices and, more particularly, to off-loaded support joints which minimize friction moment for supporting mirrors.

BACKGROUND OF THE INVENTION

In typical Cassegrain telescopes for space remote imaging such as space-born imaging satellites, the optical system typically includes a lightweight primary mirror. The intent of the lightweight design is to minimize gravity distortion for ground testing as well as to minimize overall weight of the system. In a recent project, the primary mirror was mounted on six flexure struts to approximate a kinematic mount. The upper and lower end of each strut was joined to a mount pad via a spherical ball joint. Ideally, this spherical ball joint was free to rotate during alignment and testing of the primary mirror and then was locked to the mount pad by injecting an epoxy adhesive into a clearance gap between the strut ball and a retaining cap which threaded onto the mount pad. Problems were encountered in the alignment of the primary mirror because of the weight of the mirror on the strut balls and the friction developed at the interface between the strut balls and the ball sockets when adjusting the struts. The adjustment design required that the lower strut ball, which was threaded to accept the strut, be rotated to adjust the length of the strut and, therefore, the position of the mirror. Residual bending and torsion moments in the strut were present due to friction at the interface and this resulted in an unacceptable distortion of the primary mirror surface. This required a combination of lubrication and off-loading using an external lifting device in order to align the mirror while retaining an acceptable surface quality. However, this is a time-consuming process and, even at the completion of this process, there will likely always be some distortion present.

A "float support" is sometimes used to support the primary mirror during alignment adjustments by providing a continuous or nearly continuous ring which applies an upward force on the back plate of the mirror at a radius which minimizes overall gravity distortion. The mirror is tested for wavefront quality while supported in this manner so that the local forces due to the struts are not present. However, these devices are expensive to design, manufacture and use, and the technique does not eliminate gravity induced error. In the current practice, the wavefront error due to gravity when the mirror is supported on the struts is modeled using a Finite Element code, and then is "backed out" of the measured wavefront yielding the predicted shape of the mirror in the space environment. Thus, any friction in the joints creates mirror shape errors which are not predicted, and would degrade the on-orbit performance if it is not eliminated.

A mirror support device is taught in U.S. Pat. No. 5,035, 497 to Itoh. The Itoh device employs a counterweighted lever. The lever is connected to the mirror support member via a series of links and spherical bearings which enable the lever to pivot about the center of gravity of the mirror.

The prior art fails to teach a system for off-loading which allows pivoting of the strut joints without imparting to the mirror any appreciable frictional moment which could cause distortion of the mirror surface.

SUMMARY OF THE INVENTION

It is, therefore, an object of the present invention to provide off-loaded strut joints for mirror support systems which minimize the friction developed at the ball interface.

A further object of the present invention is to provide an off-loaded strut joint system for mirrors which does not rely on external off-loading equipment but rather, has incorporated within the strut the off-loading function.

Briefly stated, the foregoing and numerous other features, objects and advantages of the present invention will become readily apparent upon a reading of the detailed description, claims and drawings set forth herein. These features, objects and advantages are accomplished by providing a support strut with a ball joint at each end. Each ball joint is preferably in the spherical. Each of the ball joints is sealed such that an internal compartment is created which can act essentially as an air spring. By raising the air pressure within these compartments, the load on the ball joint is reduced until the joint separates and air pressure alone carries the entire load. By adjusting the pressure to a value just below the separation pressure, the ball can still maintain contact with its interfacing structure but carry very little of the actual load. At this pressure, the frictional moment that can be generated by the joint is minimized and is, thus, greatly reduced from the frictional moment developed by a joint which is carrying the full gravity load of the mirror. Further, the method of length adjustment of the strut of the present invention is improved. The entire strut assembly may be translated using an adjusting screw at the lower end of the strut. This avoids the rotation of the strut and/or ball. Once adjustment of the mirror position is complete, the joint may be locked by injecting an epoxy adhesive into the cavity between the strut shank shoulder and the potting cup of the mount pad and allowed to cure. After the epoxy is cured, air pressure may be released.

DETAILED DESCRIPTION OF THE INVENTION

Figure 1:
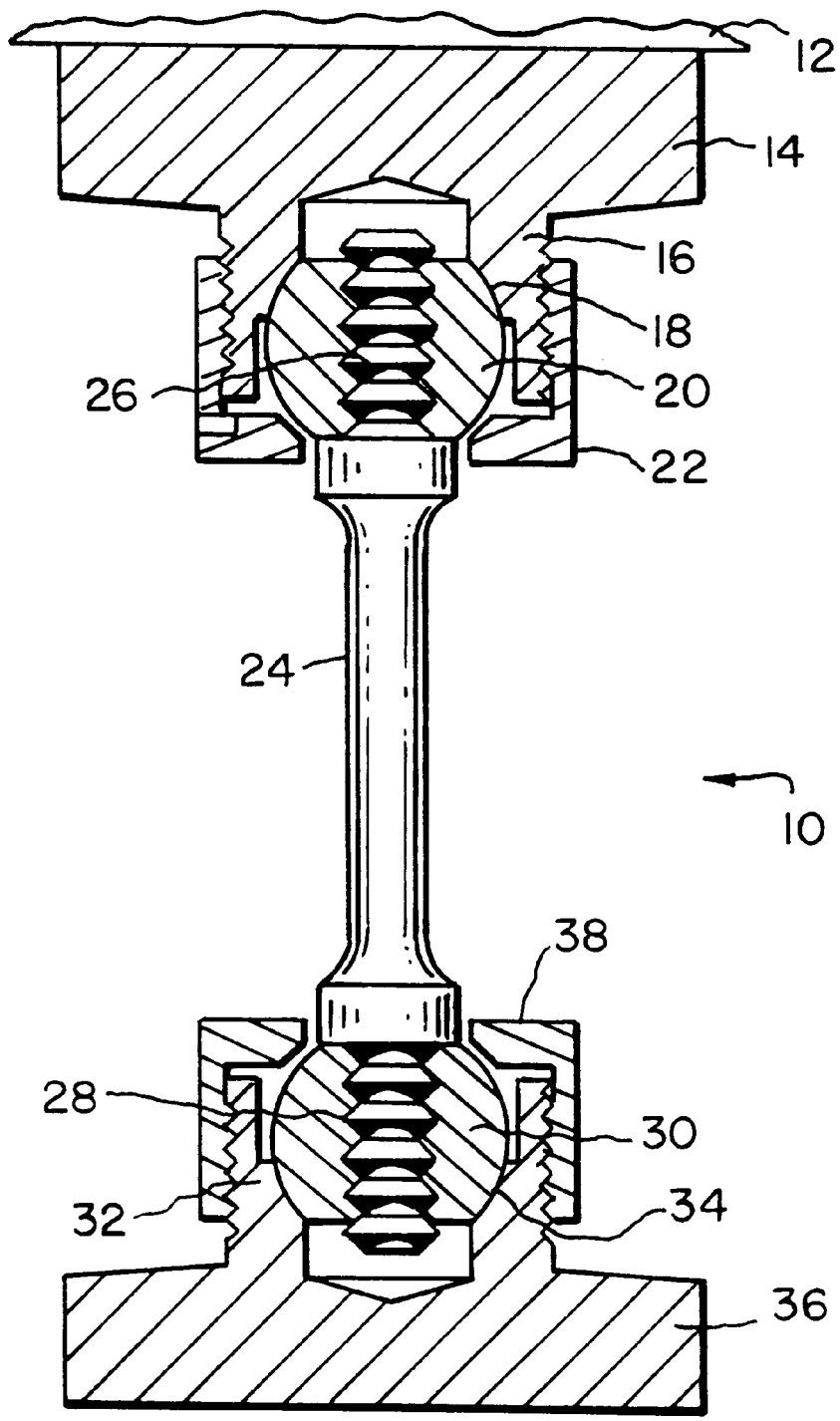
FIG. 1 is a cross-sectional view of a prior art strut joint assembly used to support a mirror.

Turning first to FIG. 1, there is shown a typical prior art strut assembly 10 used to support a mirror 12. The strut assembly 10 includes a typical mirror mount pad 14 affixed to mirror 12. The mirror mount pad 14 includes a cup section 16 with an internal radiused bearing surface or ball socket 18. Residing in cup section 16 is strut ball 20 which engages ball socket 18. Ball socket 18 and strut ball 20 form a ball joint. Strut ball 20 is retained in cup section 16 by means of cap 22 which threadably engages the outside of cup section 16. There is a strut 24 which includes a first threaded end 26 and a second threaded end 28. First threaded end 26 engages a threaded orifice through strut ball 20. Second threaded end 28 includes a similar threaded orifice in a second strut ball 30. Strut ball 30 resides in a lower cup section 32 which includes a radiused bearing surface or socket 34. Lower cup section 32 (as shown) is an integral extension of the support structure 36. There is a lower cap 38 which threadably engages the outside of lower cup section 32 to retain strut ball 30 within lower cup section 32. This type of prior art strut assembly 10 is used in a six strut system. The six strut system provides kinematic control of the six degrees of freedom of the mirror 12 as the mirror 12 is adjusted. Each strut 10 carries a vertical load component of one-sixth of the weight of the mirror 12 and mount pads 14. To adjust the position of the mirror 12, one strut assembly 10 is either driven up or down, or the strut length is adjusted. In either case, when one strut joint 10 is moved, the other five strut assemblies 10 must rotate freely to carry the load in tension or compression only with no bending of the strut 24. If there is friction in the ball joint, the result will be some bending of strut 24. This, in turn, generates a moment which is transmitted to the mirror 12 which, in turn, results in error producing distortion in mirror 12. Since frictional moments are proportional to P, R, and $\mu$, where P is load, R is the radius of the ball, and $\mu$ is the coefficient of friction, the choices available for reducing the frictional moment are to reduce the load, reduce the radius of the ball, or reduce the coefficient of friction.

Figure 2:
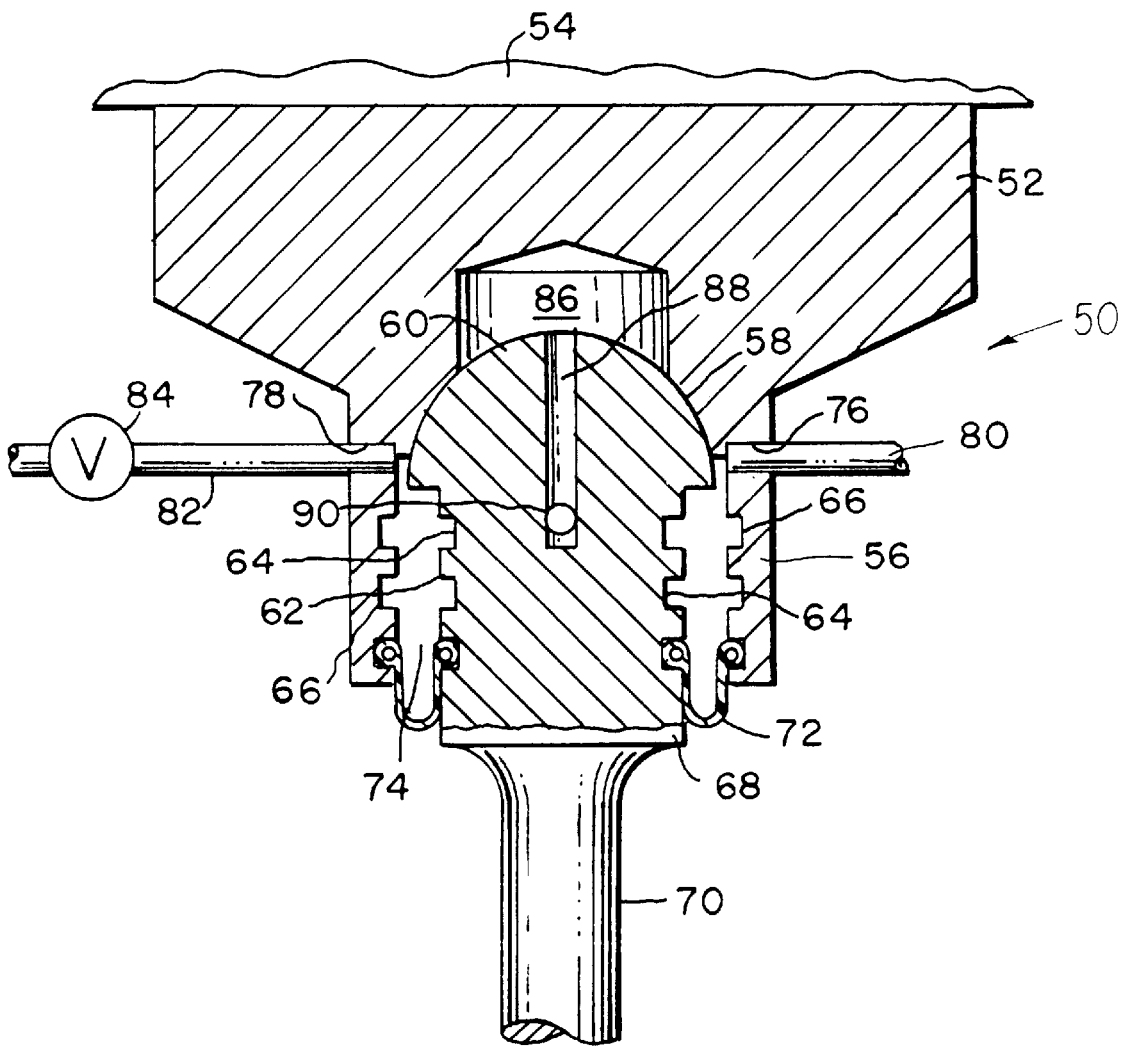
FIG. 2 is a cross-sectional view of the top portion of the strut joint assembly of the present invention.

Looking next at FIG. 2, there is shown the upper portion off-loaded strut joint assembly 50 of the present invention. Strut joint assembly 50 includes a mount pad 52 which is affixed to mirror 54. Mount pad 52 includes an integral upper cup section 56 with a radiused bearing surface or upper ball socket 58. Residing within upper cup section 16 and engaging upper ball socket 58 is upper strut ball 60. Upper strut ball 60 and upper ball socket 58 form an upper ball joint. Extending down from upper strut ball 60 is upper shank 62. There are a series of circumferential grooves 64 in upper shank 62. Similarly, there are a series of circumferential grooves 66 in the internal surface of upper cup section 56. Upper shank 62 terminates at a shoulder 68. Upper shank 62 and shoulder 68 are integral parts of strut 70 which continues to extend downward from shoulder 68. Residing between the lower portion of upper cup section 56 and shoulder 68 is a flexible rolling seal 72. Rolling seal 72 should be constructed with very little stiffness to rotation about the directions normal to the longitudinal axis of strut 70. The rolling seal should preferably be fabricated of a low durometer elastomeric material which is non-porous, compatible with the epoxy material, and which does not produce unacceptable outgassing products in the space environment. RTV is an example of such a material. It should be as thin as practicable to minimize bending stiffness, but still withstand the air pressure without risk of failure. An annular chamber 74 is defined by the inner surface of upper cup section 56, the outer surface of upper shank 62, and rolling seal 72. There is an air pressure port 76 on one side of upper cup section 50 allowing for communication with annular chamber 74. Similarly, there is an epoxy injection port 78 on an opposite side of upper cup section 56 also allowing for communication with annular chamber 74. There is tube 80 connected to air pressure port 76 through which compressed air can be injected into annular chamber 74 from a source (not shown). There is also a tube 82 connected to the epoxy injection port 78 with a valve 84 therein. A source of epoxy (not shown) is connected to valve 84.

Mount pad 52 includes cylindrical chamber 86 above upper strut ball 60. There is a bore 88 which passes through upper strut ball 60 and has an axis which is collinear with the cylindrical axis of strut 70. There is a bore 90 which passes through upper shank 62 intersecting with bore 88 with bore 88 and 90 being substantially perpendicular to one another. Bores 88 and 90 allow for the equalization of air pressure between annular chamber 74 and cylindrical chamber 86.

Increasing air pressure within annular chamber 74 and cylindrical chamber 86 via air pressure port 76 reduces the load on upper strut ball 60. Pressure can be increased until the joint separates and the air pressure carries the entire load. In other words, the air pressure can be increased until upper strut ball 60 and upper ball socket 58 separate. At that point, air pressure carries the entire load for strut joint assembly 50. By adjusting the pressure through a valve (not shown) located in tube 80 to a value just below the separation pressure, contact between upper strut ball 60 and upper ball socket 58 can be maintained while little of the load is actually carried by upper strut ball 60. At this pressure, the friction moment that can be generated by the ball joint (the interface between upper strut ball 60 and socket 58 will be minimized and will be greatly reduced from the friction moment developed by a joint which is carrying the full gravity load of mirror 54. When the adjustment of the position of mirror 54 is complete, the ball joint is locked by injecting an epoxy adhesive through valve 84 and tube 82 to thereby fill annular chamber 74. The completion of the filling of annular chamber 54 can be determined by looking for epoxy exiting through air pressure port 76 into tube 80 which, of course, is preferably clear to allow for visual inspection. The volume of air contained within tube 80 from the source (not shown) should be great enough such that the displacement of air from annular chamber 74 caused by the injection of epoxy will not increase the air pressure within annular chamber 74 and cylindrical chamber 86. Once the epoxy is injected into annular chamber 74, it is allowed to cure and, after cure, air pressure may be released. Grooves 64, 66 are provided to ensure that sufficient pull-out strength is developed in the ball joint.

In essence, rolling seals 72 in combination with annular chamber 74, bores 88, 90 and cylindrical chamber 86 create an air spring. The force of the air spring is adjustable through the amount of air pressure supplied through air pressure port 76.

Figure 3:
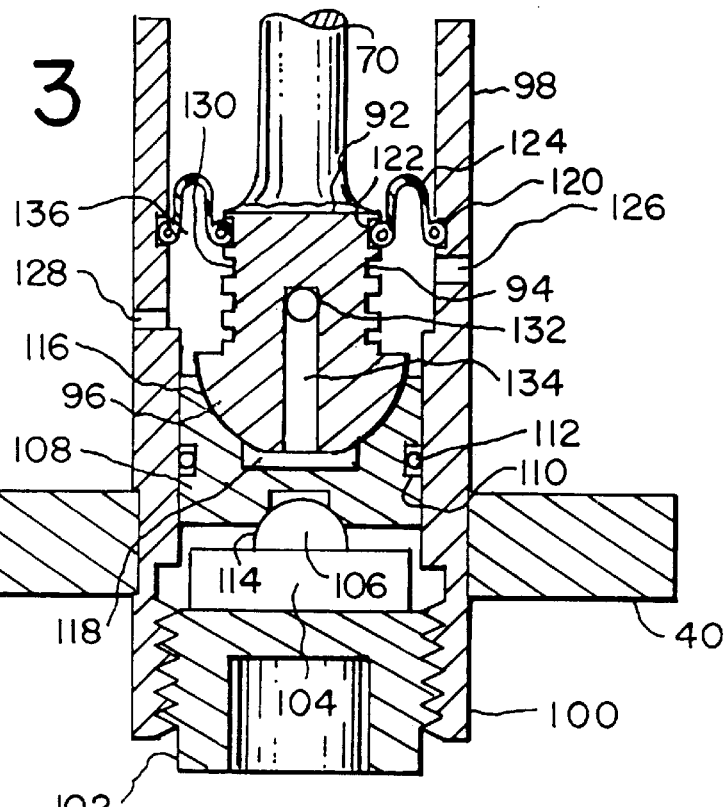
FIG. 3 is a cross-sectional view of the lower portion of the strut joint assembly of the present invention.

The lower end of strut 70 (see FIG. 3) also includes shoulder 92 and a lower shank 94 which terminates at lower strut ball 96. Lower strut ball 96, lower shank 94 and shoulder 92 reside within cylindrical housing 98 which is affixed to support structure 40. The lower end 100 of cylindrical housing 98 is internally threaded and threadably engaged therewith is strut position adjuster 102. Extending from strut position adjuster 102 is platform 104 which supports hemisphere 106 thereon. Hemisphere 106 is allowed to float laterally on platform 104. Positioned above hemisphere 106 is floating seat 108. Floating seat 108 includes an annular channel 110 therein in which resides an O-ring 112. O-ring 112 acts as a seal between floating seat 108 and the internal wall of cylindrical housing 98. Located at the base of floating seat 108 is a radiused bearing surface 114 which engages the outer surface of hemisphere 106. The upper portion of floating seat 108 includes a radiused bearing surface or lower ball socket 116 which engages the outer surface of lower strut ball 96. Lower ball socket 116 and lower strut ball 96 form a lower ball joint. Floating seat 108 further includes a chamber 118 below lower strut ball 96.

There is an annular groove 120 in the internal surface of housing 98. Similarly, there is an annular groove 122 in the circumferential surface of shoulder 92. Annular grooves 120, 122 provide residence for rolling seal 124. There is an air pressure port 126 into housing 98 which is positioned just below rolling seal 124. On the opposite side of housing 98 there is an epoxy fill port 128 which is preferably positioned lower on housing 98 than is air pressure port 126.

Lower shank 94 includes multiple grooves 130. There is a bore 132 which passes through lower shank 94 preferably perpendicular to the longitudinal axis of strut 70. Bore 132 intersects with bore 134. The cylindrical axis of bore 134 is substantially collinear with the longitudinal axis of strut 70. Bores 132, 134 create a pressure equalization passage between chamber 136 and chamber 118.

In order to align mirror 54, strut position adjuster 102 is used. Through rotation of strut position adjuster 102, floating seat 108 and strut 70 can be raised or lowered. Floating seat 108 in combination with hemisphere 106 which merely rests on platform 104 and is not affixed thereto obviates potential rotation of floating seat 108 as well as lateral translation of seat 108 which may have otherwise resulted from machining eccentricities. Hemisphere 106 accommodates wobble at the surface of platform 104 and can slide laterally on platform 104 as adjuster 102 is utilized thereby uncoupling eccentricity effects.

As was described in connection with the upper strut assembly, lower strut assembly can be off-loaded by supplying air under pressure through air pressure port 126 into chamber 136. Air pressure equalizes in chamber 118 such that the entire load of strut 70 can be carried by air pressure as opposed to the interface between lower strut ball 96 and lower ball socket 116. By adjusting the pressure to a value just below the separation pressure, lower strut bill 96 can still maintain contact with radius bearing surface 114 but carry very little of the load. At this pressure, the frictional moment that can be generated by the lower ball joint assembly will be minimized and will be greatly reduced from the frictional moment developed by a ball joint which is carrying the full gravity load. When the adjustment of the position of mirror 54 is complete, the lower ball joint is locked by injecting an epoxy adhesive through epoxy fill port 128 into chamber 136. After the epoxy adhesive is cured, air pressure may be released.

Figure 4:
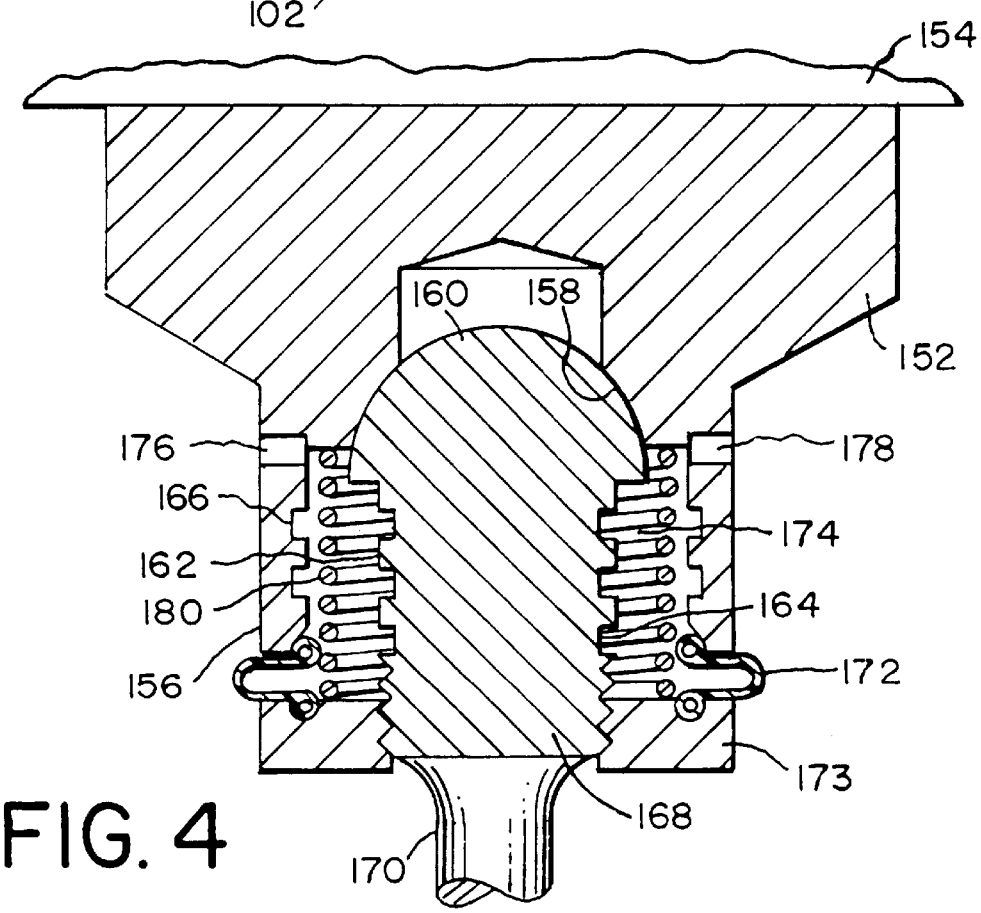
FIG. 4 is a cross-sectional view of an alternative embodiment of the strut joint assembly depicted in FIG. 2.

Turning next to FIG. 4, there is shown the upper portion of a strut joint assembly 150 which is an alternative embodiment to the strut joint assembly 50. Mount pad 152 includes an integral upper cup section 156 with a radiused bearing surface or upper ball socket 158. Residing within upper cup section 116 and engaging upper ball socket 158 is upper strut ball 160. Upper strut ball 160 and upper ball socket 158 form an upper ball joint. Extending down from upper strut ball 160 is upper shank 162. There are a series of circumferential grooves 164 in upper shank 162. Similarly, there are a series of circumferential grooves 166 in the internal surface of upper cup section 156. Upper shank 162 terminates at a threaded shoulder 168. Extending down from threaded shoulder 168 is strut 170. There is a rolling seal 172 which engages the internal surface of upper cup section 156 on one side thereof and engages adjusting nut 173 the, opposite side thereof. There is an annular chamber 174 between upper cup 156 and upper shank 162. There is an epoxy injection port 176 into one side of upper cup section 156 and an epoxy fill indicator port 178 on an opposite side of upper cup section 156. Residing in annular chamber 174 is helical coil spring 180 which preferably has a very low stiffness in rotation about directions normal to the cylindrical axis thereof. In such manner, moments due to rotational stiffness over the small range of adjustment necessary for mirror alignment are negligible as compared to fully loaded frictional moments. The force of coil spring 180 on mount pad 152 is adjusted by rotating adjusting nut 173 on threaded shoulder 168. Thus, the force of helical coil spring 180 can be adjusted until mount pad 152 just lifts off of upper strut ball 160. The adjusting nut 173 can then be backed off a small amount to allow contact between upper strut ball 160 and upper ball socket 158 but with minimal load carried by upper strut ball 160. The mirror 154 can then be aligned and, once alignment is complete, the ball joint can be locked by injecting epoxy into annular chamber 174 through epoxy injection port 176. Epoxy fill indicator port 178 allows for recognition of when annular chamber 174 has been filled. Rolling seal 172 defines the lower portion of annular chamber 174 and prevents leakage of epoxy from annular chamber 174 when epoxy is injected therein.

Extending from the bottom of strut 170 (see FIG. 5) is threaded shoulder 192 and lower shank 194 terminating in lower strut ball 196. Threadably engaging threaded shoulder 192 is adjusting nut 197. Lower strut ball 196, lower shank 194 and shoulder 192 reside within cylindrical housing 198 which is affixed to support structure 140. The lower end 200 of cylindrical housing 198 is internally threaded and threadably engaged therewith is strut position adjuster 202. Extending from strut position adjuster 202 is platform 204 which supports hemisphere 206 thereon. Hemisphere 206 is allowed to float laterally on platform 204. Positioned above hemisphere 206 is floating seat 208. Floating seat 208 includes an annular channel 210 therein in which resides an O-ring 212. O-ring 212 acts as a seal between floating seat 208 and the internal wall of cylindrical housing 198. Located at the base of floating seat 208 is a radiused bearing surface or socket 214 which engages the outer surface of hemisphere 206. The upper portion of floating seat 208 includes a radiused bearing surface or lower ball socket 216 which engages the outer surface of lower strut ball 196. Lower ball socket 216 and lower strut ball 196 form a lower ball joint. Floating seat 208 further includes a chamber 218 below lower strut ball 196.

Annular grooves 220, 222 provide residence for rolling seal 224. There is an epoxy fill indicator port 226 into housing 198 which is positioned just below rolling seal 224. On the opposite side of housing 198 there is an epoxy injection port 228 which is preferably positioned lower on housing 198 than is epoxy fill indicator port 226. Lower shank 194 includes multiple grooves 230. There is an annular chamber 236 defined on the sides by the internal surface of housing 198 and the circumferential surface of lower shank 194, on top by adjusting nut 197 and at the bottom thereof by floating by 208. Residing in annular chamber 236 is helical coil spring 240 which has a very low stiffness in rotation about the directions normal to the axis thereof. Thus, moments resulting from rotational stiffness of coil spring 240 over the small range of adjustment rotation necessary for mirror alignment are negligible compared to fully loaded friction moments. Strut position is adjusted through rotation of strut position adjuster 202. Through rotation of adjusting nut 197, lower strut ball 196 can be lifted such that it no longer engages radius bearing surface 116. Full load from strut 170 would be passed through coil spring 240 to floating seat 108 and ultimately to strut position adjuster 202 with full load, of course, being carried by the support structure 240. By backing off slightly on adjusting nut 197, contact between lower strut ball 196 and lower ball socket 116 is reinitiated but with a minimal amount of load being transmitted through lower strut ball 196. With minimal load being carried by lower strut ball 196, mirror 154 can be aligned. Once mirror 154 is aligned, the ball joint can be locked by injecting epoxy through epoxy fill port 228 to fill annular chamber 236. Once the epoxy is cured, the ball joint is locked.

Figure 5:
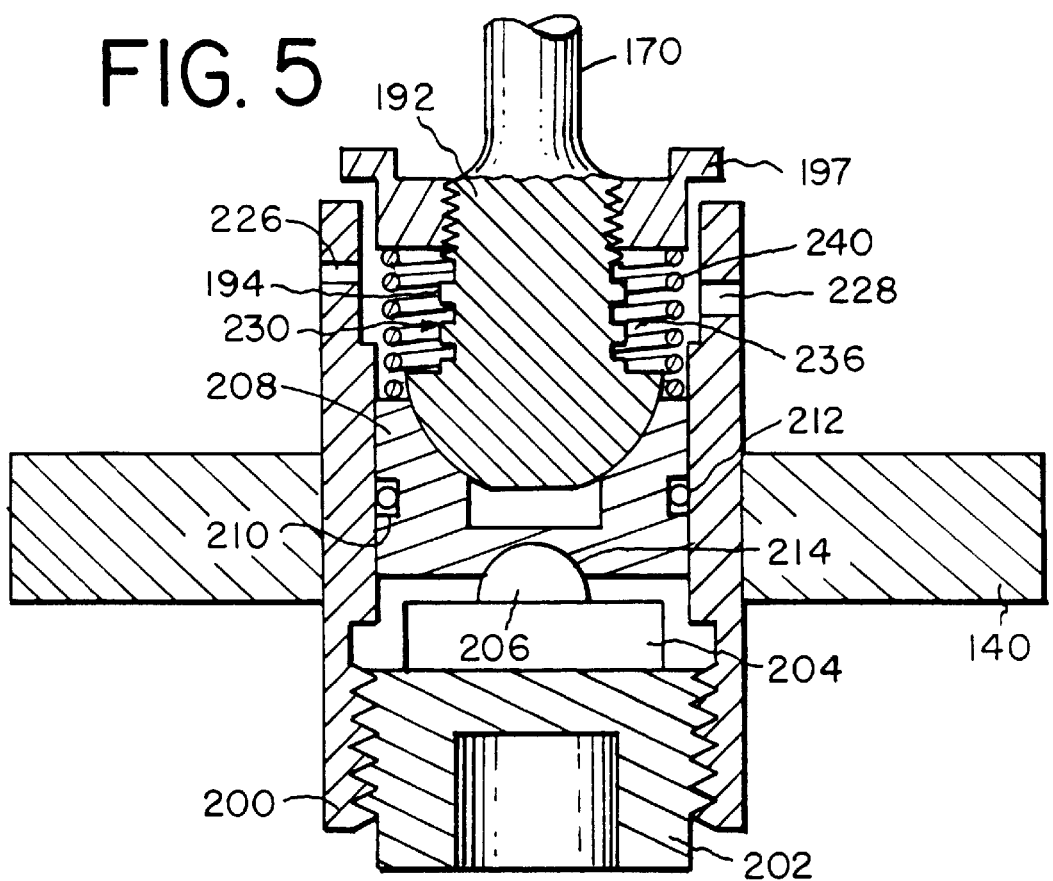
FIG. 5 is a cross-sectional view of an alternative embodiment of the lower portion of the strut joint assembly depicted in FIG. 3.

Note that FIG. 5 shows that there is no seal between housing 198 and adjusting nut 197. This assumes that housing 198 is in a vertical, upright orientation. For other orientations, it will be necessary to include a seal such as a rolling seal between adjusting nut 197 and housing 198.

Figure 6:
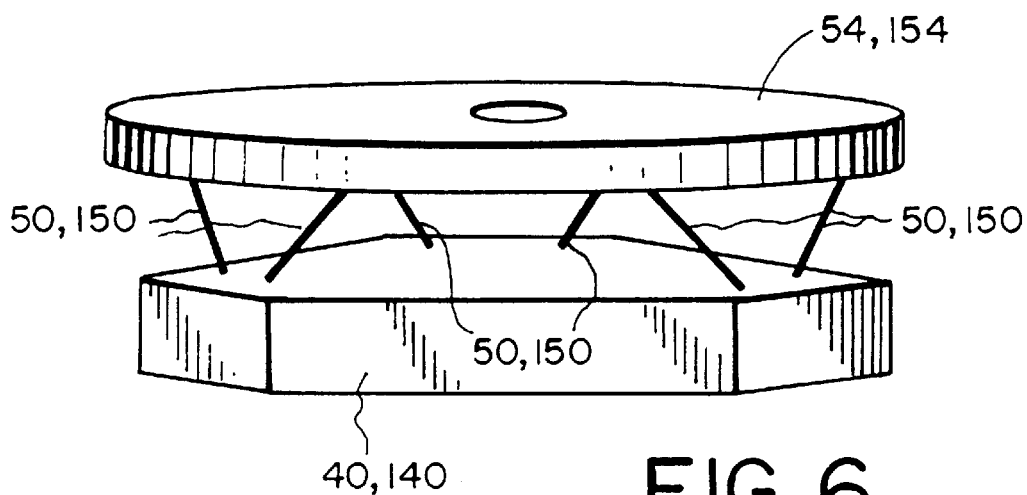
FIG. 6 is a schematic of a mirror with the corresponding support structure and an arrangement of six strut joint assemblies of the present invention.

Turning next to FIG. 6, there is shown a schematic of a mirror 54, 154 supported on six strut joint assemblies 50, 150 which are attached to a support or a reaction structure 40, 140. The adjustment is performed by translating the strut assembly in the vertical direction using the strut position adjuster 102, 202 (see FIGS. 3 and 5). The upper and lower ball joints may then be locked in arbitrary order, but essentially simultaneously.

In order to support and align a mirror 54 utilizing the strut joint assembly 50 of the present invention, the mount pads 52 are first attached to mirror 54. Housings 98 are affixed to the support structure 40 with the lower balls 96 engaging sockets 116. Upper balls 60 are left unrestrained. Rolling seals 124 are in place. Rolling seals 72 have already been installed on upper shanks 62. Mirror 54 is then lowered with the upper balls 60 positioned so that as mirror 54 descends, upper balls 60 engage upper sockets 58. At this point, mirror 54 is supported on the six strut joint assemblies 50. Rolling seals 72 are then engaged with upper cups 56. The air pressure fittings and tubing are then connected to air pressure ports 76, 126 and the epoxy injection fittings and tubing are connected to the epoxy injection ports 78, 128. The valves connected to the epoxy injection ports 78, 128 are closed. Air pressure is then applied annular chambers 74, 156 through air pressure ports 76, 126 to a pressure sufficient unseat upper balls 60 and lower balls 96 from upper sockets 58 and lower sockets 116, respectively. The air pressure is then adjusted to allow upper balls 60 and lower balls 96 to engage upper sockets 58 and lower sockets 116, respectively, but with upper balls 60 and lower balls 96 carrying minimal load. The alignment of mirror 54 is then checked and the positional error is determined. Using an adjustment matrix, the direction and magnitude of each required strut position change is then calculated. Each strut is then adjusted as required. The motion imparted during this adjustment may be measured with the appropriate instrumentation. The steps of checking the alignment of mirror 54, calculating the direction and magnitude of each required strut position change, and adjusting each strut are then repeated until mirror 54 is aligned within tolerance limits. The wavefront error of mirror 54 is determined by optical wavefront testing, and the deformation due to strut forces is substracted from the measured interferogram. If the resulting wavefront meets the requirements, strut joint assemblies 50 may be locked. Epoxy is then injected through epoxy injection ports 78, 128 with epoxy injection equipment (not shown) until the epoxy begins to flow out of the air pressure ports 76, 126. The epoxy is allowed to cure. Air pressure is maintained at the adjusted level within annular chambers 74, 136 through injection and curing of the epoxy so that upper and lower balls 60, 96 remain substantially off-loaded. A final wavefront test may then be performed to verify acceptable performance.

In order to support and align a mirror 154 utilizing the strut joint assembly 150 of the present invention, the mount pads 152 are first attached to mirror 154. Housings 198 are affixed to the support structure 140. Adjusting nuts 197 are adjusted to allow lower balls 196 to rest in ball sockets 216. Upper balls 160 are left unrestrained. Rolling seals 172 have already been installed on upper shanks 162. The upper rolling seals 172, coil springs 180, and adjusting nuts 173 are then assembled with upper shoulders 168 and upper cups 156 with adjusting nuts 173 in the "slack" position. Mirror 154 is then lowered with the upper balls 160 positioned so that as mirror 154 descends, upper balls 160 engage upper ball sockets 158. At this point, mirror 154 is supported on the six strut joint assemblies 150. Rolling seals 172 are then engaged with upper cups 156. The appropriate fittings and tubing are then connected to the epoxy injection ports 176, 226. Upper and lower adjusting nuts 173, 197 are then adjusted to compress coil springs 180, 240 to a sufficient degree to unseat (separate from) upper balls 160 and lower balls 196 from upper ball sockets 158 and lower ball sockets 216, respectively. Upper and lower adjusting nuts 173, 197 are then backed off a predetermined amount, dependent on mirror weight and spring stiffness, to allow upper balls 160 and lower balls 196 from upper ball sockets 158 and lower ball sockets 216 to re-engage with ball sockets 158, 216 carrying a very small portion of the total load. The alignment of mirror 154 is then checked and the positional error is determined. Using an adjustment matrix, the direction and magnitude of each required strut position change is then calculated. Each strut is then adjusted as required. The motion imparted during this adjustment may be measured with the appropriate instrumentation. The steps of checking the alignment of mirror 154, calculating the direction and magnitude of each required strut position change, and adjusting each strut are then repeated until mirror 54 is aligned within tolerance limits. The wavefront error of mirror 154 is determined by optical wavefront testing, and the deformation due to strut forces is substracted from the measured interferogram. If the resulting wavefront meets the requirements, strut joint assemblies 150 may be locked. Epoxy is then injected through epoxy injection ports 176, 228 with epoxy injection equipment (not shown) until the epoxy begins to flow out of the epoxy fill indicator ports 178, 226. The epoxy is allowed to cure. A final wavefront test may then be performed to verify acceptable performance.

In using strut joint assemblies 50, 150 of the present invention, all six upper ball joints and all six lower ball joints should be off-loaded throughout mirror alignment, epoxy injection and epoxy cure. It is important to be able to perform an optical test in the off-loaded condition. Ideally, all six upper ball joints and all six lower ball joints would be epoxied simultaneously. As a practical matter, epoxy injection can be performed one ball joint at a time.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth are shown in the accompanying drawings is to be interpreted as illustrative and not in a limiting sense.

What is claimed is:

1. A mirror supporting apparatus comprising:
   (a) a mirror mount pad;
   (b) a cup section extending from said mirror mount pad, said cup section including an upper socket;
   (c) a strut including an upper shank portion, said upper shank portion terminating at an upper strut ball, said upper strut ball residing in said upper socket;
   (d) a first annular chamber between said upper shank portion and said cup section; and (e) a first adjustable spring means residing in said annular chamber for transmitting load from said mount pad to said strut while bypassing said upper strut ball.

2. A mirror supporting apparatus as recited in claim 1 further comprising:
   (a) an epoxy injection port in said cup section communicating with said first annular chamber; and
   (b) an epoxy fill indicator port in said cup section communicating with said first annular chamber.

3. A mirror supporting apparatus as recited in claim 1 further comprising:
   (a) a lower shank portion extending from said strut, said lower shank portion terminating at a lower strut ball;
   (b) a housing;
   (c) a floating seat residing in said housing, said floating seat including a lower socket, said lower strut ball engaging said lower socket;
   (d) a second annular chamber between said lower shank portion and said housing; and
   (e) a second adjustable spring means residing in said second annular chamber for transmitting load from said strut to said floating seat while bypassing said lower strut ball.

4. A mirror supporting apparatus as recited in claim 3 further comprising:
   a threaded plug threadably engaging an internal surface of said housing, said threaded plug allowing for elevation adjustment of said floating seat within said housing.

5. A mirror supporting apparatus as recited in claim 4 further comprising:
   a hemisphere movably resting on top of said threaded plug, said hemisphere engaging a radiused bearing surface in a bottom wall of said floating seat.

6. A mirror supporting apparatus as recited in claim 1 further comprising:
   (a) a first internal chamber in said mount pad above said upper strut ball; and
   (b) a first pressure equalization passage through said upper strut ball and upper shank portion, said first pressure equalization passage extending between said first annular chamber and said first internal chamber.

7. A mirror supporting apparatus as recited in claim 6 wherein:
   said first adjustable spring means is an air spring.

8. A mirror supporting apparatus as recited in claim 6 further comprising:
   a first rolling seal between said strut and said cup section.

9. A mirror supporting apparatus as recited in claim 8 wherein said first adjustable spring means comprises:
   (a) a gas in said first annular chamber and said first internal chamber; and
   (b) means for controlling a pressure of said gas.

10. A mirror supporting apparatus as recited in claim 6 wherein:
    said first adjustable spring means is a coil string.

11. A mirror supporting apparatus as recited in claim 3 further comprising:
    (a) a second internal chamber in said floating seat below said lower strut ball; and
    (b) a second pressure equalization passage through said lower strut ball and lower shank portion, said second pressure equalization passage extending between said second annular chamber and said second internal chamber.

12. A mirror supporting apparatus as recited in claim 11 wherein:
    said second adjustable spring means is an air spring.

13. A mirror supporting apparatus as recited in claim 11 further comprising:
    rolling seal between said strut and said housing.

14. A mirror supporting apparatus as recited in claim 13 wherein said second adjustable spring means comprises:
    (a) a gas in said second annular chamber and said second internal chamber; and
    (b) means for controlling a pressure of said gas in said second annular chamber and said second internal chamber.

15. A mirror supporting apparatus as recited in claim 11 wherein:
    said second adjustable spring means is a coil spring.

16. A mirror supporting apparatus as recited in claim 1 further comprising:
    (a) an epoxy injection bore in said housing communicating with said second annular chamber; and
    (b) an epoxy fill indicator bore in said housing communicating with said second annular chamber.

17. A method for supporting a mirror for alignment thereof, said method comprising the steps of:
    (a) supporting the mirror on six strut joint assemblies, each of said strut joint assemblies including an upper ball joint and a lower ball joint, each upper ball joint including an upper ball and an upper ball socket, each lower ball joint including an lower ball and an lower ball socket;
    (b) adjusting a first spring means associated with each upper ball joint to cause said upper ball to unseat from said upper ball socket;
    (c) adjusting a second spring means associated with each lower ball joint to cause said lower ball to unseat from said lower ball socket;
    (d) re-adjusting each of said first spring means to allow said upper ball to reseat and carry a minimal portion of a total load; and
    (e) re-adjusting each of said second spring means to allow said lower ball to reseat and carry a minimal portion of the total load.

18. A method as recited in claim 17 further comprising the steps of:
    (a) aligning the mirror;
    (b) locking said upper and lower ball joints with an epoxy while said upper and lower ball joints are carrying only the minimal portion of the total load; and
    (c) allowing the epoxy to cure while said upper and lower ball joints are carrying only the minimal portion of the total load.

* * * * *